United States Patent
Shibayama et al.

(10) Patent No.: US 9,594,197 B2
(45) Date of Patent: Mar. 14, 2017

(54) OPTICAL ELEMENT, AND METHOD FOR PRODUCING SAME

(71) Applicant: HAMAMATSU PHOTONICS K.K., Hamamatsu-shi, Shizuoka (JP)

(72) Inventors: Katsumi Shibayama, Hamamatsu (JP); Takafumi Yokino, Hamamatsu (JP); Katsuhiko Kato, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 38 days.

(21) Appl. No.: 14/418,962

(22) PCT Filed: Jun. 13, 2013

(86) PCT No.: PCT/JP2013/066326
§ 371 (c)(1),
(2) Date: Feb. 2, 2015

(87) PCT Pub. No.: WO2014/024565
PCT Pub. Date: Feb. 13, 2014

(65) Prior Publication Data
US 2015/0205017 A1 Jul. 23, 2015

(30) Foreign Application Priority Data

Aug. 6, 2012 (JP) .................. 2012-174324

(51) Int. Cl.
*G02B 5/18* (2006.01)
*B29C 39/10* (2006.01)
(Continued)

(52) U.S. Cl.
CPC ............ *G02B 5/1861* (2013.01); *B29C 39/10* (2013.01); *B29C 43/021* (2013.01);
(Continued)

(58) Field of Classification Search
CPC .......... G02B 5/10; G02B 5/18; G02B 5/1814; G02B 5/1847; G02B 5/1861; G02B 5/1895;
(Continued)

(56) References Cited

U.S. PATENT DOCUMENTS 3,985,443 A * 10/1976 Danielsson ............. G01J 3/189
356/305
4,798,446 A * 1/1989 Hettrick ............... G02B 5/1861
359/570
(Continued)

FOREIGN PATENT DOCUMENTS

CN 1367879 9/2002
CN 1677136 10/2005
(Continued)

OTHER PUBLICATIONS

English-language translation of International Preliminary Report on Patentability (IPRP) dated Feb. 19, 2015 that issued in WO Patent Application No. PCT/JP2013/066326.

*Primary Examiner* — Bumsuk Won
*Assistant Examiner* — William R Alexander
(74) *Attorney, Agent, or Firm* — Drinker Biddle & Reath LLP (57) ABSTRACT

An optical element includes a base having a curved depression formed in a front surface thereof and a formed layer arranged on the base. The formed layer includes a main part in the depression as viewed from a depth direction of the depression and an overhang on the front surface of the base while connecting to the main part. An opposite surface of the main part to a surface thereof on a side of an inner surface of the depression is formed like a concave curve that is concave in a same direction as the inner surface of the depression. A predetermined surface of the main part that is (Continued)

opposed to the inner surface of the depression is provided with an optical function part.

7 Claims, 10 Drawing Sheets (51) Int. Cl.
   *G02B 3/00* (2006.01)
   *G02B 5/10* (2006.01)
   *B29C 43/02* (2006.01)
   *B29C 43/36* (2006.01)
   *G02B 5/08* (2006.01)
   *B29L 11/00* (2006.01)
   *G02B 13/00* (2006.01)

(52) U.S. Cl.
   CPC .............. *B29C 43/361* (2013.01); *G02B 3/00* (2013.01); *G02B 5/08* (2013.01); *G02B 5/10* (2013.01); *G02B 5/1814* (2013.01); *G02B 5/1847* (2013.01); *G02B 5/1895* (2013.01); *B29C 2043/3615* (2013.01); *B29L 2011/0016* (2013.01); *G02B 5/1819* (2013.01); *G02B 13/0085* (2013.01)

(58) Field of Classification Search
   CPC .. G02B 3/00; G02B 3/08; B29C 39/10; B29C 43/021; B29C 43/361; B29C 43/3615; B29L 2011/0016
   USPC ................................ 359/572, 558, 565, 566
   See application file for complete search history.

(56) References Cited

U.S. PATENT DOCUMENTS

| | | | | |
|---|---|---|---|---|
| 5,543,966 A * | 8/1996 | Meyers | ................ | G02B 5/1876 359/565 |
| 5,550,375 A * | 8/1996 | Peters | ................ | G01J 3/02 250/343 |
| 5,715,091 A * | 2/1998 | Meyers | ................ | G02B 5/1876 359/565 |
| 6,375,366 B1 * | 4/2002 | Kato | ................ | G03B 15/00 348/143 |
| 6,534,903 B1 * | 3/2003 | Spiro | ................ | F21V 7/22 313/112 |
| 2002/0015231 A1 | 2/2002 | Ogawa | | |
| 2002/0036827 A1 | 3/2002 | Nakai | | |
| 2002/0163688 A1 * | 11/2002 | Zhu | ................ | H04B 10/2581 398/144 |
| 2005/0219702 A1 | 10/2005 | Nakai | | |
| 2010/0277730 A1 * | 11/2010 | Kimura | ................ | G01J 3/02 356/328 |
| 2011/0080584 A1 * | 4/2011 | Ko | ................ | G01J 3/02 356/328 |
| 2011/0128541 A1 * | 6/2011 | Grueger | ................ | G01J 3/0256 356/326 |
| 2012/0002785 A1 * | 1/2012 | Kaneko | ................ | G21K 1/067 378/62 |
| 2012/0045619 A1 | 2/2012 | Ando et al. | | |
| 2012/0140214 A1 * | 6/2012 | Shibayama | ................ | G01J 3/02 356/300 |
| 2014/0022642 A1 * | 1/2014 | Yokino | ................ | G02B 5/00 359/566 |

FOREIGN PATENT DOCUMENTS

| | | |
|---|---|---|
| CN | 102375167 | 3/2012 |
| EP | 1 193 512 | 4/2002 |
| JP | H07-72310 A | 3/1995 |
| JP | 2003-266450 A | 9/2003 |
| JP | 2005-173597 A | 6/2005 |
| JP | 2005-520213 A | 7/2005 |
| JP | 2006-177994 A | 7/2006 |
| JP | 2007-199540 A | 8/2007 |
| JP | 2011-215074 A | 10/2011 |
| JP | 2012-063764 A | 3/2012 |

* cited by examiner

OPTICAL ELEMENT, AND METHOD FOR PRODUCING SAME

TECHNICAL FIELD

The present invention relates to an optical element and a method of producing the same.

BACKGROUND ART

As a conventional method of producing an optical element, there is a known method in which a formed layer to be provided with an optical function part such as a grating is formed in the depression of a base by pressing a forming mold against a resin material arranged in the depression of the base and curing the resin material (for example, see Patent Literatures 1 to 5).

CITATION LIST

Patent Literature

Patent Literature 1: Japanese Patent Application Laid-Open Publication No. 2006-177994
Patent Literature 2: Japanese Patent Application Laid-Open Publication No. 2007-199540
Patent Literature 3: Japanese Patent Application Laid-Open Publication No. 2003-266450
Patent Literature 4: Japanese Patent Application Laid-Open Publication No. 2005-173597
Patent Literature 5: Japanese Unexamined Patent Application Publication (Translation of PCT Application) No. 2005-520213

SUMMARY OF INVENTION

Technical Problem

In the optical element produced by the method as described above, however, the formed layer as a whole is in the depression of the base, and, in addition, stress caused by temperature changes during use or other reasons concentrates on the depression of the base, so that the formed layer may be separated from the base. Moreover, shrinkage or expansion of the formed layer resulting from temperature changes during use or other reasons may deform the optical function part provided in the formed layer.

The present invention therefore aims to provide an optical element and a method of producing the same in which separation of the formed layer and deformation of the optical function part can be prevented.

Solution to Problem

An optical element according to an aspect of the present invention includes a base having a curved depression formed in a front surface thereof and a formed layer arranged on the base. The formed layer includes a first portion in the depression as viewed from a depth direction of the depression and a second portion on the front surface of the base while connecting to the first portion. An opposite surface of the first portion to a surface thereof on a side of an inner surface of the depression is formed like a concave curve that is concave in a same direction as the inner surface of the depression. A predetermined surface of the first portion that is opposed to the inner surface of the depression is provided with an optical function part.

In this optical element, the opposite surface of the first portion to the surface thereof on the side of the inner surface of the depression of the base is formed like a concave curve that is concave in the same direction as the inner surface of the curved depression of the base, so that the change in thickness of the formed layer in the first portion is gradual. This configuration can reduce the effect of shrinkage caused in the first portion, for example, when the formed layer is cured. Even when stress caused by temperature changes during use or other reasons concentrates on the depression of the base, the second portion on the front surface of the base while connecting to the first portion presses the first portion in the depression of the base. Separation of the formed layer from the base is thereby prevented. In addition, shrinkage or expansion of the formed layer resulting from temperature changes during use or other reasons is absorbed by the second portion on the front surface of the base, so that shrinkage or expansion of the first portion in the depression of the base is alleviated. Consequently, deformation of the predetermined surface of the first portion is prevented and deformation of the optical function part provided at the predetermined surface is prevented accordingly. As described above, in this optical element, separation of the formed layer and deformation of the optical function part can be prevented.

A groove portion may be provided outside of an opening of the depression in the front surface of the base. The second portion may be embedded in the groove portion. Spreading of the second portion of the formed layer on the front surface of the substrate thereby can be controlled. Since the second portion is embedded in the groove, the fixing strength of the formed layer to the base can be improved.

The curvature of the depression of the base may be greater than the curvature of the concave curve of the opposite surface of the first portion to the surface thereof on the side of the inner surface of the depression. According to this configuration, for example, when the formed layer is formed by pressing a forming mold, the front end of the forming mold does not come into abutment with the inner surface of the depression of the base, thereby suppressing damage to the inner surface of the depression of the base and to the forming mold.

The thickness of the second portion in the depth direction of the depression may be greater than the thickness of the first portion in the depth direction of the depression. This configuration can suppress deformation of the first portion of the formed layer.

The optical function part may be a grating. Alternatively, the optical function part may be a mirror. According to these configurations, a grating element or a mirror element with a simple construction can be obtained.

A method of producing an optical element according to an aspect of the present invention includes: a step of preparing a base having a curved depression formed in a front surface thereof; a step of arranging a forming material on the base; and a step of pressing a forming mold against the forming material and curing the forming material thereby forming a formed layer having a first portion in the depression as viewed from a depth direction of the depression and a second portion on the front surface of the base while connecting to the first portion. An opposite surface of the first portion to a surface thereof on a side of an inner surface of the depression is formed like a concave curve that is concave in a same direction as the inner surface of the depression. The forming mold is provided with a forming surface for forming a predetermined surface to be provided with an optical function part in the first portion such that the predetermined surface is opposed to the inner surface of the depression.

In this method of producing an optical element, the opposite surface of the first portion to the surface thereof on the side of the inner surface of the depression of the base is formed like a concave curve that is concave in the same direction as the inner surface of the curved depression of the base, so that the change in thickness of the formed layer in the first portion is gradual. This configuration can reduce the effect of shrinkage caused in the first portion, for example, when the formed layer is cured. Even when the forming material shrinks during curing, the second portion on the front surface of the base while connecting to the first portion shrinks in precedence to the first portion, thereby alleviating shrinkage of the first portion in the depression of the base. Consequently, deformation of the predetermined surface of the first portion is prevented and deformation of the optical function part provided at the predetermined surface is prevented accordingly. In addition, even when stress caused by temperature changes during production or other reasons concentrates on the depression of the base, the second portion on the front surface of the base presses the first portion in the depression of the base. Separation of the formed layer from the base is thereby prevented. As described above, with this method of producing an optical element, separation of the formed layer and deformation of the optical function part can be prevented.

Advantageous Effects of Invention

According to an aspect of the present invention, separation of the formed layer and deformation of the optical function part can be prevented.

BRIEF DESCRIPTION OF DRAWINGS

FIGS. 7 (a) and (b) are cross-sectional views of the optical element according to other embodiments of the present invention.

FIGS. 8 (a) and (b) are views of the optical element according to other embodiments of the present invention, where FIG. 8 (a) is a plan view and FIG. 8 (b) is an end view along line VIIIb-VIIIb in FIG. 8 (a).

FIG. 9 (a) to (c) are plan views showing examples of a groove in the optical element according to other embodiments of the present invention.

DESCRIPTION OF EMBODIMENTS

An embodiment of the present invention will be described in details below with reference to the drawings. It is noted that in the drawings the same or corresponding parts are denoted with the same reference signs and an overlapping description will be omitted.

Figure 1:
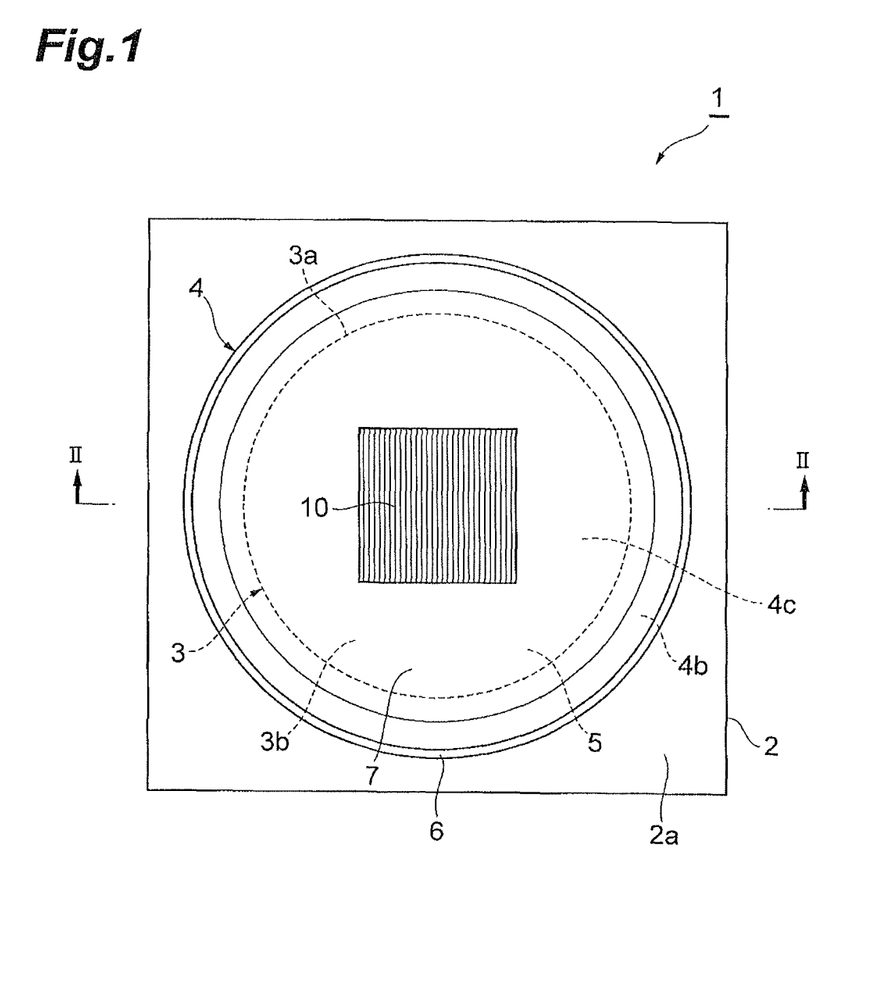
FIG. 1 is a plan view of an optical element according to an embodiment of the present invention.
Figure 2:
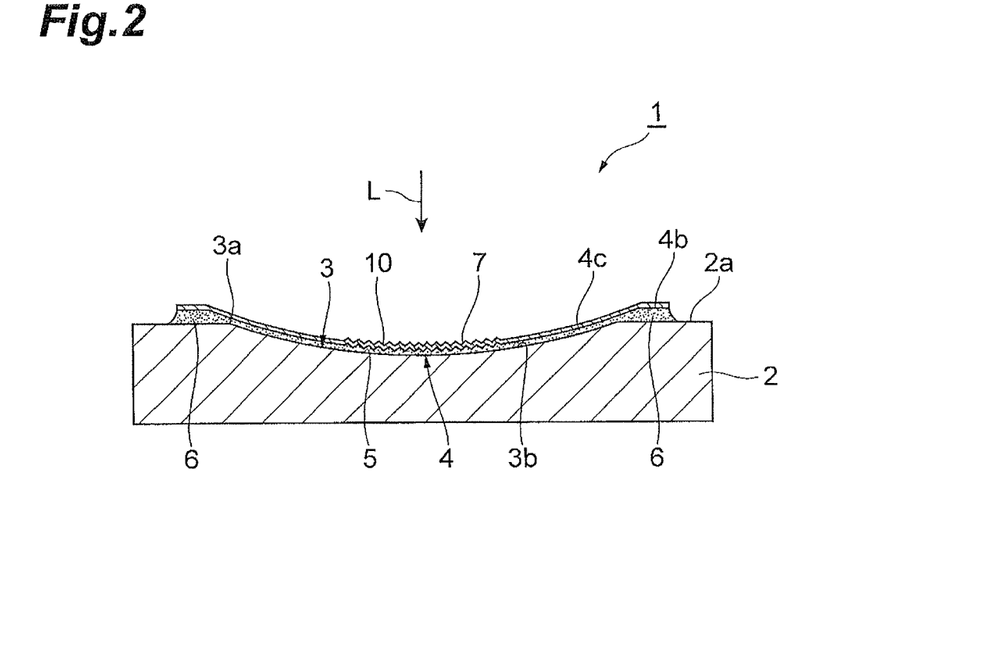
FIG. 2 is an end view of the optical element taken along the line II-II in FIG. 1.

As shown in FIG. 1 and FIG. 2, an optical element 1 includes an optical function part 10 that is a reflective grating. The optical function part 10 diffracts and reflects light L incident from one side. The optical element 1 includes a base 2 formed like a square plate (for example, outer shape of 8 mm×8 mm, thickness of 1 mm) made of silicon, plastic, ceramic, glass, or other substances. A depression 3 having a spherical inner surface 3b is formed in a front surface 2a of the base 2. The material of the base 2 is not limited to the materials described above, and the base 2 can be formed with a variety of materials by forming, cutting, etching, or other means. The inner surface 3b of the depression 3 may not have a spherical shape but may have a non-spherical shape.

On the base 2, a formed layer 4 is arranged which is formed by photocuring an optical resin for replicas, such as photocurable epoxy resins, acrylic resins, fluorocarbon resins, silicone, or organic-inorganic hybrid resins. The formed layer 4 has a circular shape as viewed from the depth direction (that is, one side) of the depression 3. The material of the formed layer 4 is not limited to photocurable resins as described above and a variety of materials (forming materials) capable of forming with a forming mold 30 described later and curing can be applied, such as thermosetting resin materials, low-melting glass, or organic-inorganic hybrid glass.

The formed layer 4 includes a main part (first portion) 5 and an overhang (second portion) 6 that are integrally formed. The main part 5 is in the depression 3 as viewed from the depth direction of the depression 3 and covers the inner surface 3b of the depression 3 as a whole. The overhang 6 is on the front surface 2a of the base 2, being connected to the main part 5, and is provided outside of an annular opening 3a. That is, the overhang 6 is provided so as to surround the depression 3. The thickness of the overhang 6 in the depth direction of the depression 3 is greater than the thickness of the main part 5 in the depth direction of the depression 3.

In the formed layer 4, a curved surface 4c formed like a concave curve is provided at a part of a surface 4b (a predetermined surface) (hereinafter referred to as the "front surface" of the formed layer 4) on the side opposite to the side of the base 2 that corresponds to the main part 5. The curved surface 4c is concave in the same direction as the inner surface 3b of the depression 3. That is, that part of the formed layer 4 which corresponds to the main part 5 is arranged along the inner surface 3b of the depression 3 of the base 2. In the present embodiment, the curvature of the curved surface 4c of the main part 5 is formed to be equal to the curvature of the inner surface 3b of the depression 3.

In a predetermined area of the curved surface 4c on the main part 5, a grating pattern is formed which corresponds to a brazed grating having a serrated cross section, a binary grating having a rectangular cross section, a holographic grating having a sinusoidal cross section, or other gratings.

On the front surface 4b of the formed layer 4, a reflective film 7 that is a deposited film of Al, Au, or other substances is formed. The reflective film 7 is formed so as to correspond to the grating pattern in the predetermined area of the front surface 4b on the main part 5, and this part serves as the optical function part 10 that is a reflective grating. The material of the reflective film 7 is not limited to the materials described above and a variety of materials can be applied. A protective film or an antireflection film of $SiO_2$, $SiN$, $MgF_2$, or other substances may be formed on the reflective film 7 by deposition, sputtering, CVD, or other processes. A bonding layer of Cr, Ni, NiCr, Ti, TiN, or other substances may be formed between the formed layer 4 and the reflective film 7 by deposition, sputtering, CVD, or other processes.

As described above, in the optical element 1, the curved surface 4c, which is the part of the front surface 4b of the formed layer 4 that corresponds to the main part 5, is formed like a concave curve that is concave in the same direction as the inner surface 3b of the depression 3 of the base 2, so that the change in thickness of the formed layer 4 in the main part 5 is gradual. In the present embodiment, in particular, the curvature of the curved surface 4c of the main part 5 is formed to be equal to the curvature of the inner surface 3b of the depression 3, so that the thickness of the formed layer 4 in the main part 5 can be reduced (for example, 1 μm to 100 μm). This configuration can reduce the effect of shrinkage caused, for example, when the formed layer is cured with UV radiation or heat. In addition, even when stress caused by temperature changes during use or other reasons concentrates on the depression 3 of the base 2, the overhang 6 on the front surface 2a of the base 2 and connected to the main part 5 presses the main part 5 in the depression 3 of the base 2. This effect is attributable to that the front surface 2a with the overhang 6 thereon is a surface discontinuous from the inner surface 3b of the depression 3 (in the optical element 1, the curved, inner surface 3b of the depression 3 is connected with the planar, front surface 2a). In addition, since the overhang 6 is provided so as to surround the depression 3, the main part 5 is pressed uniformly from the periphery. Separation of the formed layer 4 from the base 2 is thereby reliably prevented.

Moreover, shrinkage or expansion of the formed layer 4 resulting from temperature changes during use or other reasons is absorbed by the overhang 6 on the front surface 2a of the base 2, so that shrinkage or expansion of the main part 5 in the depression 3 of the base 2 is alleviated. In addition, since the overhang 6 is provided so as to surround the depression 3, shrinkage or expansion of the main part 5 is uniformly alleviated. The thickness of the overhang 6 is formed to be greater than the thickness of the main part 5. Consequently, deformation of the curved surface 4c of the main part 5 is reliably prevented and deformation of the optical function part 10 provided at the curved surface 4c is reliably prevented accordingly. In the optical element 1, therefore, separation of the formed layer 4 and deformation of the optical function part 10 can be reliably prevented with a simple construction.

Figure 3:
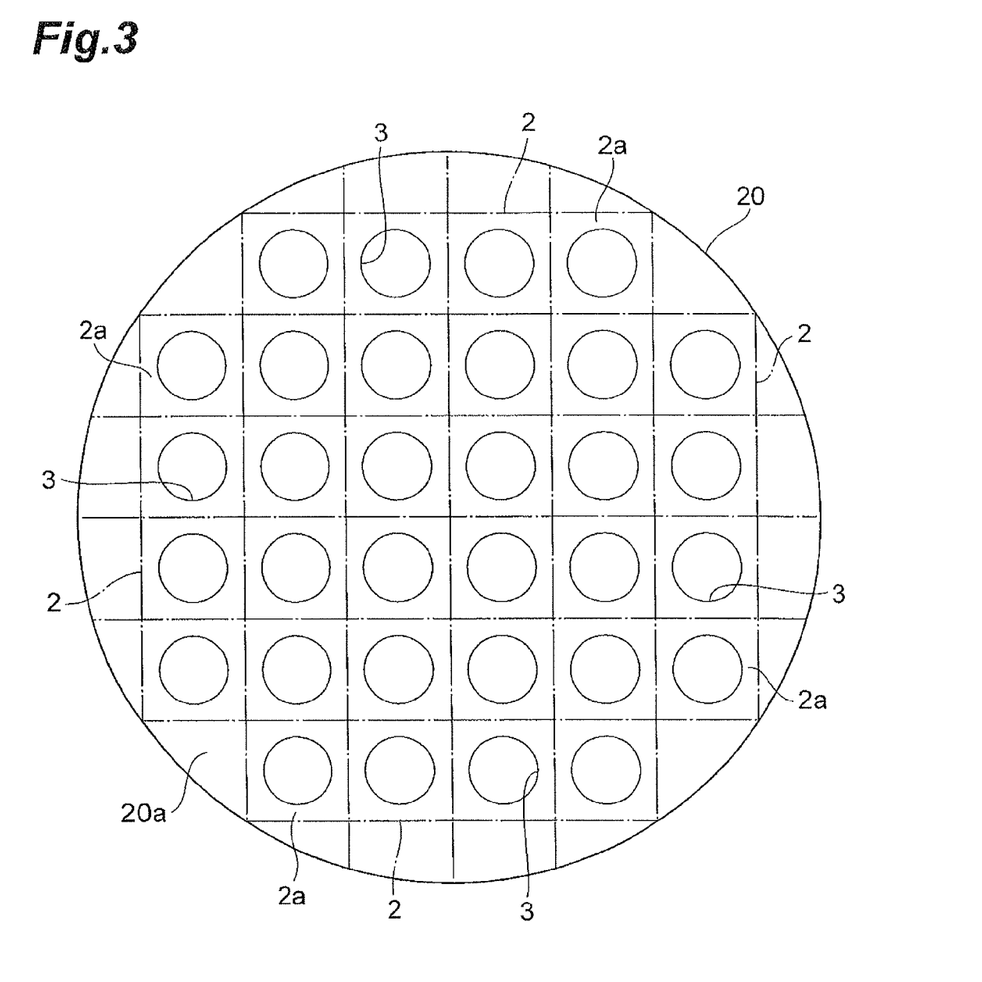
FIG. 3 is a plan view of a substrate in a step of a method of producing the optical element in FIG. 1.

Next, a method of producing the optical element 1 described above will be described. First, as shown in FIG. 3, a substrate 20, for example, made of silicon is prepared. The substrate 20 is cut (diced) into a grid pattern, resulting in a plurality of bases 2. In the front surface 20a of the substrate 20, the depression 3 is then formed for each of the front surfaces 2a of the bases 2 by etching or other processes. A plurality of bases 2 each having the depression 3 in the front surface 2a are thus prepared. Subsequently, on the front surface 20a of the substrate 20, a forming material (here, a photocurable resin material) for producing the formed layer 4 is arranged for each of the depressions 3 of the bases 2. The forming material is thus arranged on a plurality of bases 2.

Figure 4:
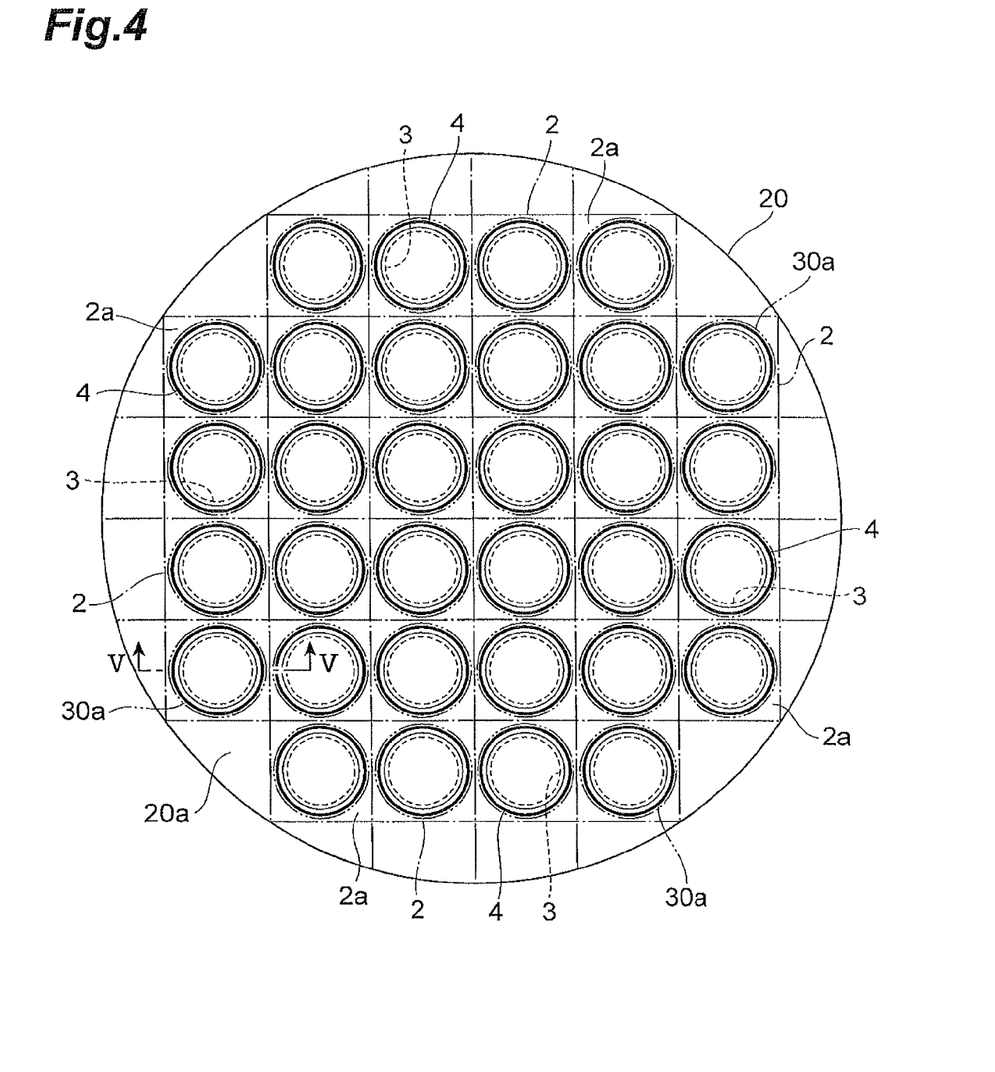
FIG. 4 is a plan view of the substrate in a step subsequent to the step in FIG. 3.
Figure 5:
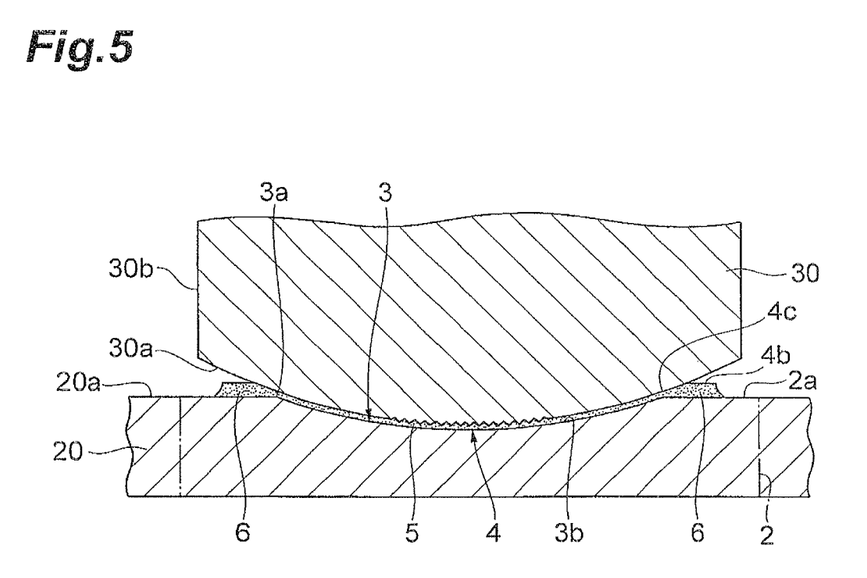
FIG. 5 is a cross-sectional view of the substrate taken along the line V-V in FIG. 4.

Subsequently, as shown in FIG. 4 and FIG. 5, a forming mold 30 is pressed against the forming material for each of the depressions 3 of the bases 2. In this state, light (for example, ultraviolet rays) for photocuring the forming material is transmitted through the forming mold 30 and applied to the forming material to cure the forming material, thereby forming the formed layer 4 having the main part 5 and the overhang 6. The formed layer 4 may be further thermally cured after the forming mold 30 is released from the formed layer 4. If the base 2 has transparency to light for photocuring the forming material, the light may be transmitted through the base 2 and applied to the forming material. The method of curing the forming material is not limited to photocuring and a variety of curing methods such as thermal curing can be applied depending on the kinds of the forming material. In the case where the formed layer 4 is thermally cured, the forming mold 30 is not limited to the one having transparency and may be formed of a metal such as nickel.

The forming mold 30 is provided with a forming surface 30a for forming the curved surface 4c to be provided with the optical function part 10 in the front surface 4b of the formed layer 4. Here, the forming surface 30a is a convex curved surface complementary to the curved surface 4c.

Figure 6:
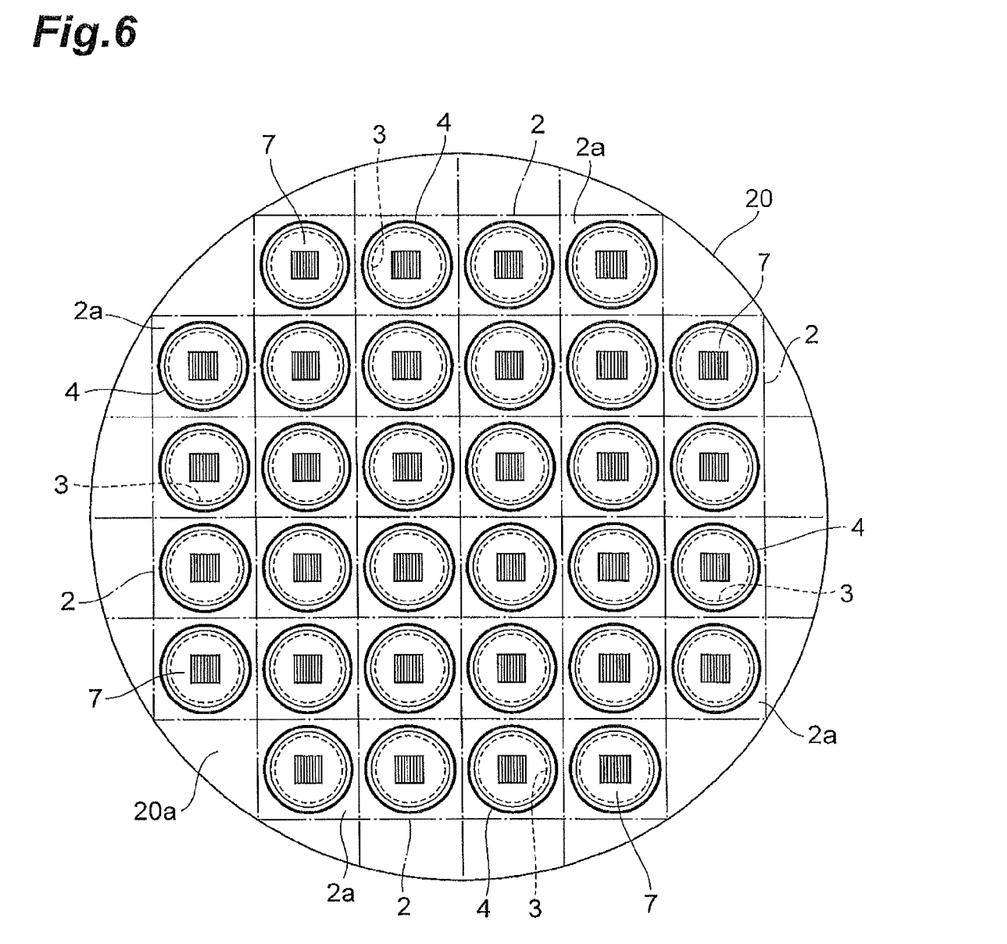
FIG. 6 is a plan view of the substrate in a step subsequent to the step in FIG. 4.

Subsequently, as shown in FIG. 6, the reflective film 7 is formed on the front surface 4b of the formed layer 4 by depositing Al, Au, or other substances, and the optical function part 10 is provided for each curved surface 4c. The deposition is performed on the entire surface of the front surface 4b or any given range of the front surface 4b (mask deposition), as necessary. The substrate 20 is then cut (diced) into a grid pattern, resulting in a plurality of optical elements 1 as grating elements. The forming of a plastic material, glass, or ceramic may be used to obtain the base 2 having the depression 3. The reflective film 7 may be formed by sputtering or CVD, rather than deposition.

As described above, in the method of producing the optical element 1, the curved surface 4c, which is the part of the front surface 4b of the formed layer 4 that corresponds to the main part 5, is formed like a concave curve that is concave in the same direction as the inner surface 3b of the depression 3 of the base 2, so that the change in thickness of the formed layer 4 in the main part 5 is gradual. In particular, when the curvature of the curved surface 4c of the main part 5 is set equal to the curvature of the inner surface 3b of the depression 3, the thickness of the formed layer 4 in the main part 5 can be constant. This configuration can reduce the effect of shrinkage caused, for example, when the formed layer is cured by UV radiation or heat. In the method of producing the optical element 1, even when the forming material shrinks during curing, the overhang 6 on the front surface 2a of the base 2 while connecting to the main part 5 shrinks in precedence to the main part 5, thereby alleviating shrinkage of the main part 5 in the depression 3 of the base 2. In addition, since the overhang 6 is provided so as to surround the depression 3, shrinkage of the main part 5 is uniformly alleviated. Consequently, deformation of the curved surface 4c of the main part 5 is reliably prevented and deformation of the optical function part 10 provided at the curved surface 4c is reliably prevented accordingly.

In addition, even when stress caused by temperature changes during production or other reasons concentrates on the depression 3 of the base 2, the overhang 6 on the front surface 2a of the base 2 presses the main part 5 in the depression 3 of the base 2. Moreover, since the overhang 6 is provided so as to surround the depression 3, the main part 5 is pressed uniformly from the periphery. Separation of the formed layer 4 from the base 2 is thereby reliably prevented. With the method of producing the optical element 1, therefore, separation of the formed layer 4 and deformation of the optical function part 10 can be reliably prevented.

The peripheral edge of the forming surface 30a of the forming mold 30 may be shaped so as to extend outward from the opening 3a of the depression 3. In this case, when the forming mold 30 is pressed against the forming material, the front end of the forming mold 30 is prevented from burying in the forming material and the forming material is prevented from coming around to the side surface 30b of the forming mold 30. Accordingly, when the forming mold 30 is pressed against the forming material, the forming material comes into abutment only with the forming surface 30a, thereby improving the releasability of the forming mold 30.

Figure 7:
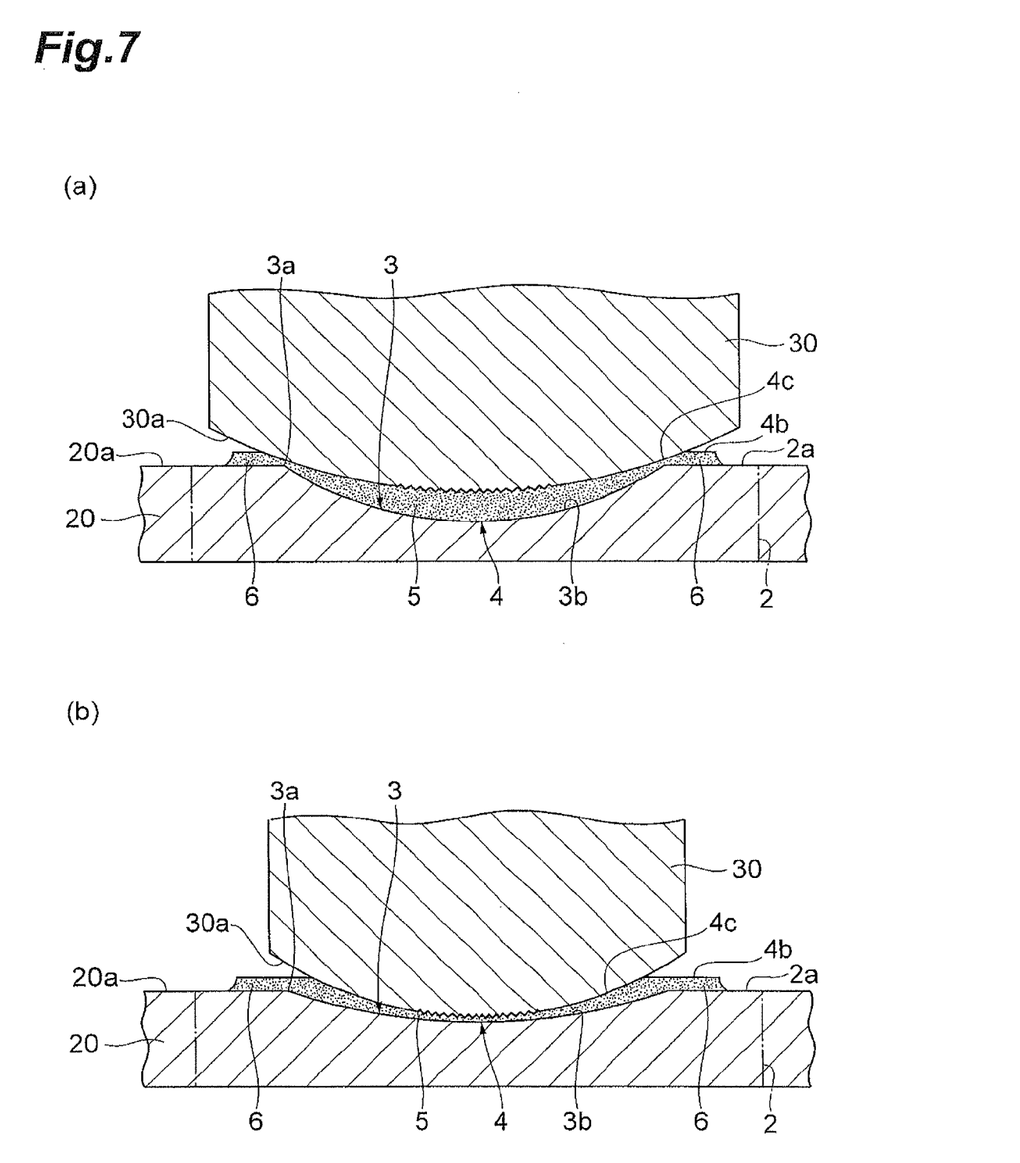

An embodiment of the present invention has been described above. However, the present invention is not limited to the foregoing embodiment. For example, as shown in FIG. 7(a), the curvature of the inner surface 3b of the depression 3 of the base 2 can be set greater than the curvature of the forming surface 30a of the forming mold 30. According to this manner, when the formed layer 4 is formed by pressing the forming mold 30, the forming surface 30a of the forming mold 30 does not come into abutment with the inner surface 3b of the depression 3 of the base 2, thereby suppressing damage to the inner surface 3b of the depression 3 of the base 2 and to the forming mold 30. Alternatively, as shown in FIG. 7(b), the curvature of the inner surface 3b of the depression 3 of the base 2 may be set smaller than the curvature of the forming surface 30a of the forming mold 30. The formed layer 4 that is thin at the center of the main part 5 is thus obtained. The optical function part 10 is formed at the thin part of the main part 5, whereby even when the formed layer 4 shrinks due to heat during use or other reasons, the ratio of shrinkage is small, because the thickness is small at the part where the optical function part 10 is formed. This configuration can suppress the effect of shrinkage of the formed layer 4 on the optical function part 10.

Figure 8:
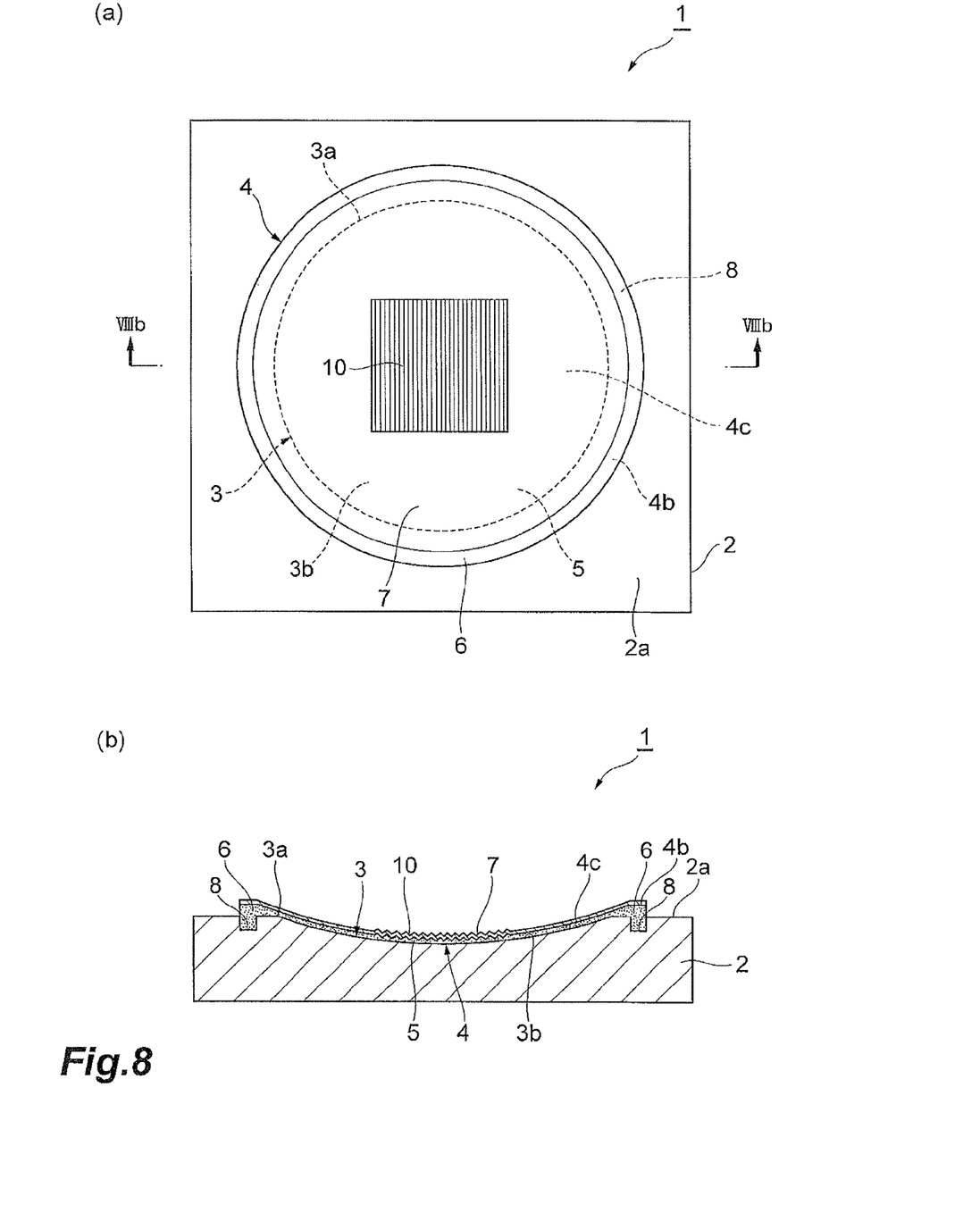

As shown in FIG. 8(a) and FIG. 8(b), in the front surface 2a of the base 2, a groove (groove portion) 8 may be provided outside of the opening 3a of the depression 3. This groove 8 may be formed in an annular shape surrounding the depression 3. In this case, when the forming mold 30 is pressed against the forming material arranged on the base 2, the forming material enters the groove 8. That is, when the forming material spreads outward from the depression 3, the forming material enters the groove 8 thereby restraining the spreading of the forming material. The forming material is cured in this state, so that the overhang 6 is embedded in the groove 8. As described above, the spreading of the overhang 6 of the formed layer 4 on the front surface 2a of the base 2 can be controlled by providing the groove 8 in the front surface 2a of the base 2. Accordingly, the base 2 can be reduced in size or the depression 3 can be increased in size. In addition, the fixing strength of the formed layer 4 to the base 2 can be improved because the overhang 6 is embedded in the groove 8.

Figure 9:
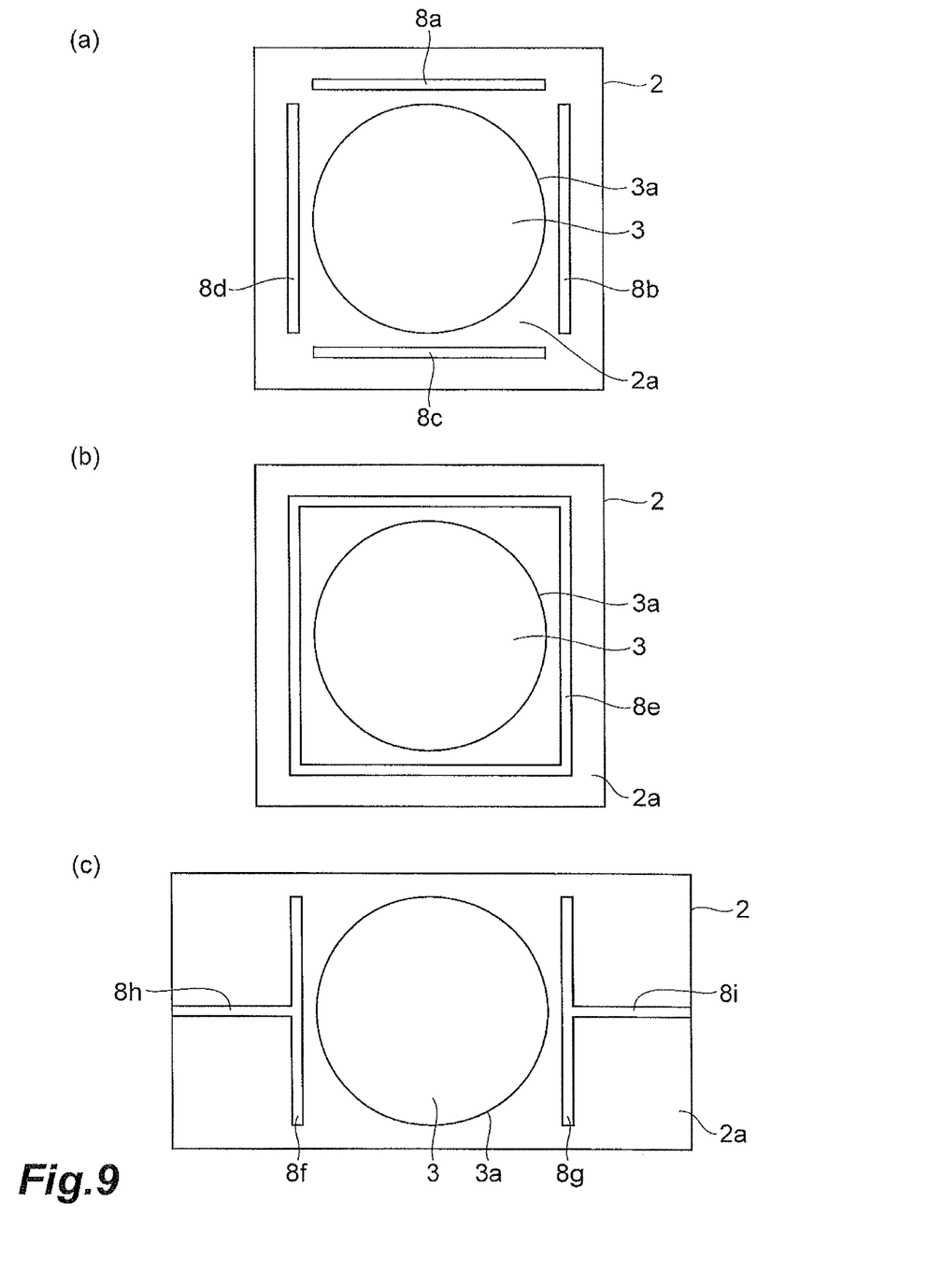

As a modification to the groove 8 provided in the front surface 2a of the base 2, as shown in FIG. 9(a), in the front surface 2a of the base 2, linear grooves 8a to 8d may be provided so as to surround the depression 3 at a position outside of the opening 3a of the depression 3. A predetermined gap is provided between theses grooves 8a to 8d. Alternatively, as shown in FIG. 9(b), in the front surface 2a of the base 2, a groove 8e shaped like a square frame may be provided so as to surround the depression 3 at a position outside of the opening 3a of the depression 3. Alternatively, as shown in FIG. 9(c), in the front surface 2a of the base 2, a pair of grooves 8f, 8g may be provided with the depression 3 interposed therebetween at a position outside of the opening 3a of the depression 3, and grooves 8h, 8i may be provided to extend from the grooves 8f, 8g, respectively, to connect to the outer edge of the base 2. Also in those cases, the forming material enters the groove, thereby controlling the spreading of the overhang 6 of the formed layer 4 on the front surface 2a of the base 2.

Figure 10:
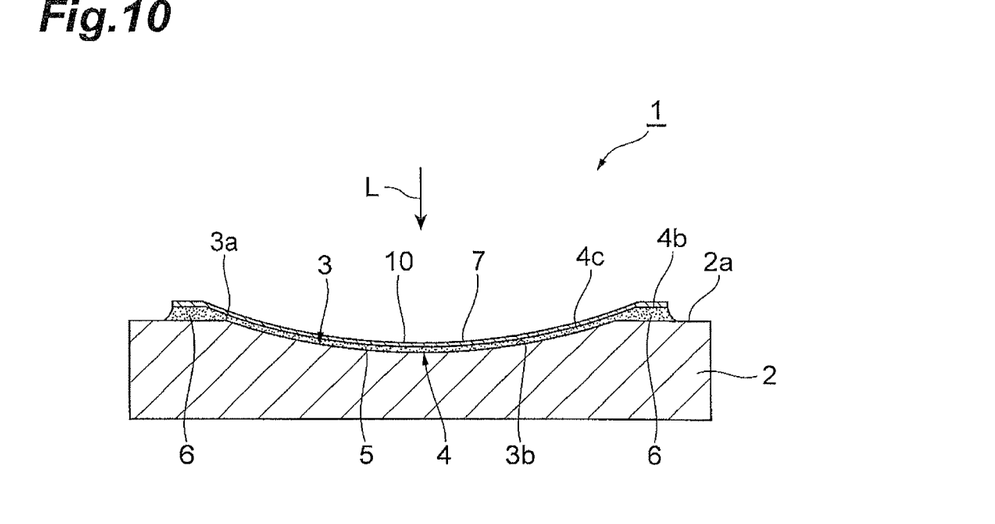
FIG. 10 is an end view of the optical element according to yet another embodiment of the present invention.

The optical function part 10 is not limited to a grating and may have a variety of optical functions. As an example, as shown in FIG. 10, the optical function part 10 may be formed as a mirror, rather than forming a grating pattern on the curved surface 4c of the formed layer 4 and on the reflective film 7. In this case, a mirror element with a simple configuration can be obtained. The refractive index may be matched at the interface between the base 2 and the formed layer 4, and light L may be applied to the optical function part 10 from the side of the base 2 (the other side). When light L is applied from either one side or the other side, the reflective film 7 may not be provided and light L may be transmitted through the optical function part 10 (for example, a transparent grating).

The predetermined surface of the formed layer 4 that is provided with the optical function part 10 is not limited to the curved surface 4c. The predetermined may be a part of the front surface 4b that extends from the main part 5 to the overhang 6.

As shown, for example, in FIG. 1, the overhang 6 is formed in an annular shape so as to surround the depression 3. However, the overhung 6 may not be annular and may be provided only on one side.

A depression may be provided in place of the groove 8 in the front surface 2a of the base 2. A rectangular depression or a circular depression may be employed as this depression. Also in this case, the overhang 6 enters the depression provided in place of the groove 8, thereby improving the fixing strength of the formed layer 4. In the case where the base 2 is rectangular and the opening 3a of the depression 3 is circular as viewed from the depth direction of the depression provided in place of the groove 8, depressions (the depression provided in place of the groove 8) are provided with the depression 3 interposed therebetween on a diagonal line of the base 2, so that the base 2 can be reduced in size or the area of the opening 3a can be increased.

A plurality of optical elements 1 are obtained by cutting (dicing) the substrate 20 into a grid pattern. However, the optical elements 1 can be formed one by one.

INDUSTRIAL APPLICABILITY

According to an aspect of the present invention, an optical element and a method of producing the same are provided, in which separation of the formed layer and deformation of the optical function part can be prevented.

REFERENCE SIGNS LIST

1 . . . optical element, 2 . . . base, 2a . . . front surface, 3 . . . depression, 3a . . . opening, 3b inner surface, 4 . . . formed layer, 4b front surface (predetermined surface), 4c . . . curved surface (opposite surface), 5 . . . main part (first portion), 6 . . . overhang (second portion), 8, 8a to 8i . . . groove (groove portion), 10 . . . optical function part, 30 . . . forming mold, 30a . . . forming surface.

The invention claimed is:
1. An optical element comprising:
  a base having a curved depression formed in a front surface thereof; and
  a formed layer arranged on the base, wherein
  the formed layer includes a first portion in the depression as viewed from a depth direction of the depression and a second portion on the front surface of the base while connecting to the first portion, an opposite surface of the first portion to a surface thereof on a side of an inner surface of the depression is formed like a concave curve that is concave in a same direction as the inner surface of the depression, a predetermined surface of the first portion that is opposed to the inner surface of the depression is provided with an optical function part, a thickness of at least a part of the second portion in the depth direction of the depression is greater than a thickness of at least a part of the first portion, and the second portion is formed on the front surface, and the inner surface of the depression being a curved surface and the front surface of the base being a flat surface are contiguous.

2. The optical element according to claim 1, wherein a groove portion is provided outside of an opening of the depression in the front surface of the base, and the second portion is embedded in the groove portion.

3. The optical element according to claim 1, wherein a radius of curvature of the depression of the base is greater than a curvature of the concave curve of the opposite surface of the first portion.

4. The optical element according to claim 1, wherein a thickness of the second portion in the depth direction of the depression is greater than a thickness of the first portion in the depth direction of the depression.

5. The optical element according to claim 1, wherein the optical function part is a grating.

6. The optical element according to claim 1, wherein the optical function part is a mirror.

7. A method of producing an optical element comprising:

a step of preparing a base having a curved depression formed in a front surface thereof;

a step of arranging a forming material on the base; and a step of pressing a forming mold against the forming material and curing the forming material thereby forming a formed layer having a first portion in the depression as viewed from a depth direction of the depression and a second portion on the front surface of the base while connecting to the first portion, an opposite surface of the first portion to a surface thereof on a side of an inner surface of the depression being formed like a concave curve that is concave in a same direction as the inner surface of the depression, wherein the forming mold is provided with a forming surface for forming a predetermined surface to be provided with an optical function part in the first portion such that the predetermined surface is opposed to the inner surface of the depression, a thickness of at least a part of the second portion in the depth direction of the depression is greater than a thickness of at least a part of the first portion, and the second portion is formed on the front surface, and the inner surface of the depression being a curved surface and the front surface of the base being a flat surface are contiguous.

* * * * *